May 21, 1957 G. M. MAST 2,792,747
RECTIFYING AND PROJECTING APPARATUS FOR AERIAL PHOTOGRAPHS
Filed Sept. 10, 1954 3 Sheets-Sheet 1
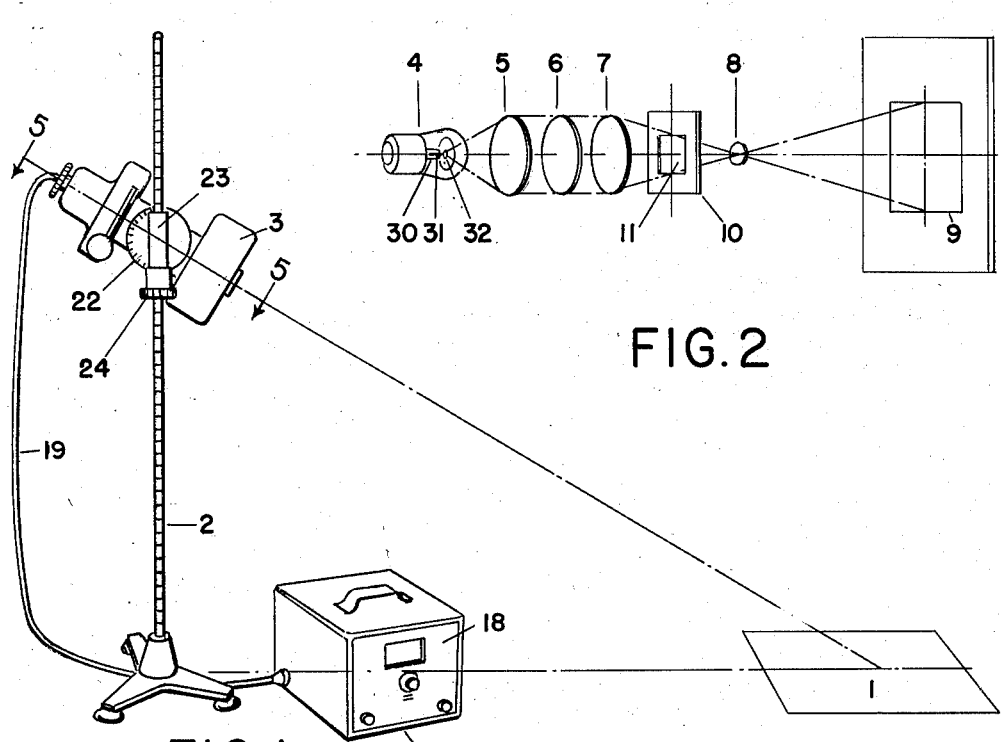
FIG. 2
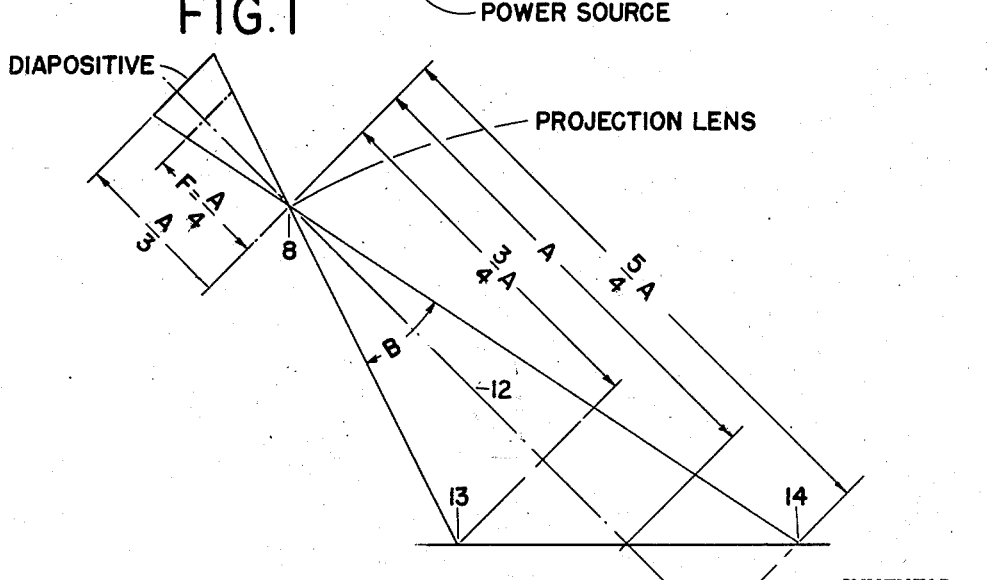
FIG. 1
FIG. 3
INVENTOR.
GIFFORD M. MAST
BY
Bruno C Lechler
PATENT ATTORNEY May 21, 1957 G. M. MAST 2,792,747
RECTIFYING AND PROJECTING APPARATUS FOR AERIAL PHOTOGRAPHS
Filed Sept. 10, 1954 3 Sheets-Sheet 2

INVENTOR.
GIFFORD M. MAST
BY
*Bruno C Lechler*
PATENT ATTORNEY

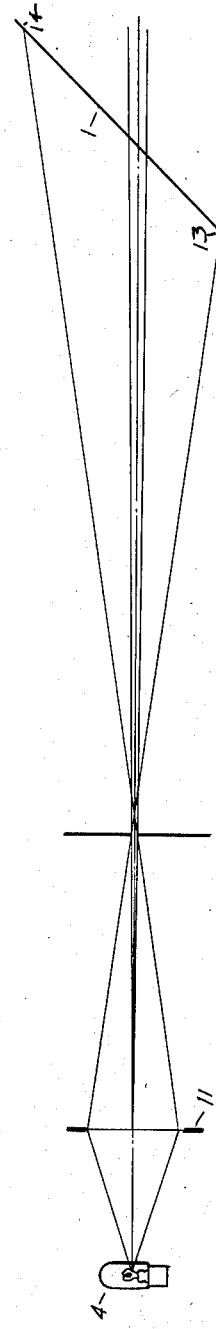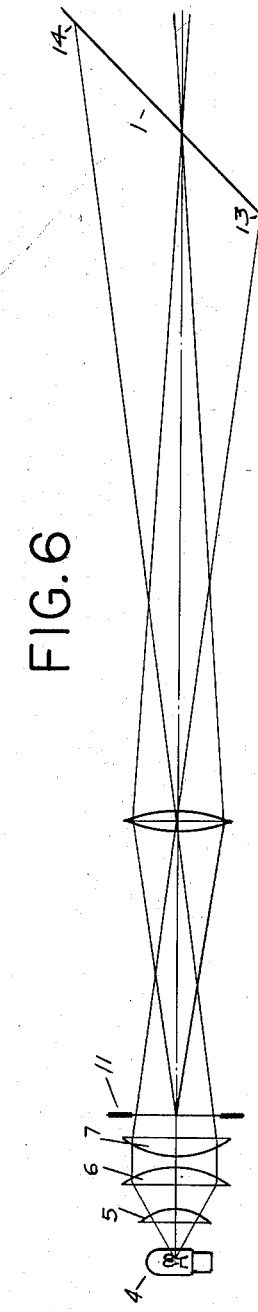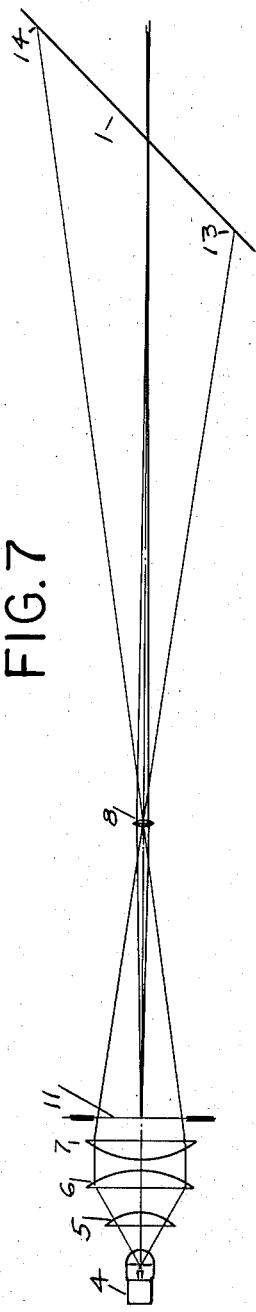
INVENTOR
GIFFORD M. MAST

United States Patent Office 2,792,747
Patented May 21, 1957

2,792,747
RECTIFYING AND PROJECTING APPARATUS FOR AERIAL PHOTOGRAPHS

Gifford M. Mast, Davenport, Iowa

Application September 10, 1954, Serial No. 455,205

10 Claims. (Cl. 88—24)

This invention relates to an improved method and a simplified device for rectifying and projecting aerial photographs to the end that the effects of tilt, distortion, and imperfect resolution are diminished, whereas sharpness of definition, adequate illumination, and unusual depth of focus are achieved.

The fundamental objective of my invention is to provide a small, compact, and simple device for rectifying aerial photographs.

A further objective is to provide a simple instrument and device that, without complex calculation or complicated adjustment will rectify aerial photographs taken by cameras having different focal lengths.

A further objective of my invention is to provide a method and device which will resolve angular and focal errors caused by uneven screen surface, diapositive bulge, and/or other factors which tend to modify correct projection focal distance.

A basic objective of my invention is to provide a method and device for rectifying aerial photographs which, in itself, will combine the simplicity and portability of the pin hole type projector while providing the more adequate illumination and image definition of the customary projector; in a word, to combine the distinct advantages of the two previous methods which have characterized the art, while eliminating the distinct disadvantages associated with each.

Cooke (U. S. Patent No. 1,713,498) and Zwillinger (U. S. Patent No. 2,448,568) originated these two methods which, to a large extent, comprise the prior art. Essentially, Cooke utilizes a system of lenses and a light source in conformity to well known and conventional optical practices. In order to attain the objective of precision rectification, complex calculations, determinations of relative configurations, and complicated adjustments and procedures are required to carry out the method.

On the other hand, Zwillinger employs the principle of the pin hole projector. The latter method and apparatus obviate the bulk, weight, and complication of the Cooke's method but at the expense of projection quality, image resolution, and illumination.

My invention consists of a point source of illumination, namely a zirconium arc lamp, a condenser-diapositive-lens system arranged in a novel and mutually beneficial relationship, a diapositive position-control for achieving focus, and a direct optic-selection-control for the projection of photographs taken by cameras having different focal lengths.

In U. S. Patent No. 2,448,568 Zwillinger states: "However, no attempt is made by Cooke or any other patentee, to our knowledge, to use a pin hole rather than a lens for projection, since it is obvious that a pin-hole could not be used in the apparatus disclosed by Cooke, because the photograph is placed between the light source and the lens, and if a pin-hole were to be used, it must necessarily be large enough to transmit sufficient light for reproduction, and the image produced would be diffused. In our device we have positioned the pin hole between the light source and the photograph so that the pin hole may be intensely illuminated by means of a system of condenser lenses."

Now, and as a matter of fact, this invention achieves precisely what Zwillinger indicated would be desirable but which he admitted could not be accomplished by any then known means.

In my device the photograph is placed between the light source and the lens. But, by using an intense point light source, such as a zirconium arc, the pin hole need not be so large as to produce diffusion. In my system components are aligned in the following order: zirconium arc point light source, condenser lenses, diapositive, micro projection lens, and screen. In order to maintain the proper relationship between light source, condenser lens, and projection lens, focusing is achieved by the unusual technique of moving the diapositive, while the rest of the optical system remains fixed.

The profound significants of the optical arrangement is most evident upon examination of the effects. Reference to Figures 6, 7, and 8 indicate diagrammatically the subject optical system in comparison with prior art. In the camera obscura type (Figure 6), the point for each light cone is located at the diapositive annd the bright spot and attendant circles of confusion get wider and wider as the screen is approached. In the customary lens arrangement (Figure 7), the point for each light cone is located at the diapositive and again at the projection screen, the circles of confusion becoming smaller and smaller as the screen is approached at a rate dependent upon the diameter of the $f$/stop of the projection lens. In my invention, through the use of an extremely intense point light source, such as the zirconium arc lamp, I am able to employ an extremely small lens, a micro lens, and consequently reduce the angle of the cone of light from lens to screen to such an extent that the screen can be far out of true focus without impairing the quality of image resolution. And, the use of a small effective aperture allows the employment of simple, single element lenses, which through their simplicity and size diminish the possibilties of lens introduced distortions and which, in turn, are inexpensive to purchase.

With the preceding analysis in view and having summarized the major objectives of my invention, the following, accompanied by drawings and illustrations, is a descriptive analysis and explanation of the construction, combination, and arrangement of components which constitute the invention.

Figure 1 shows, in perspective, an embodiment of the invention.

Figure 2 shows, in perspective, the lens system used.

Figure 3 is a diagram showing the mathematical relations involved.

Figure 6 shows diagrammatically projection in accordance with prior art through a small hole as in a camera obscura.

Figure 7 shows diagrammatically the projection in accordance with prior art using the usual large diameter projection.

Figure 8 shows diagrammatically the projection according to the invention.

Referring to Figure 1, the plat or screen is indicated at 1 and a stand at 2 supporting a projector housing 3. A power source 18 supplies current to the projector housing through cable 19.

Figure 4:
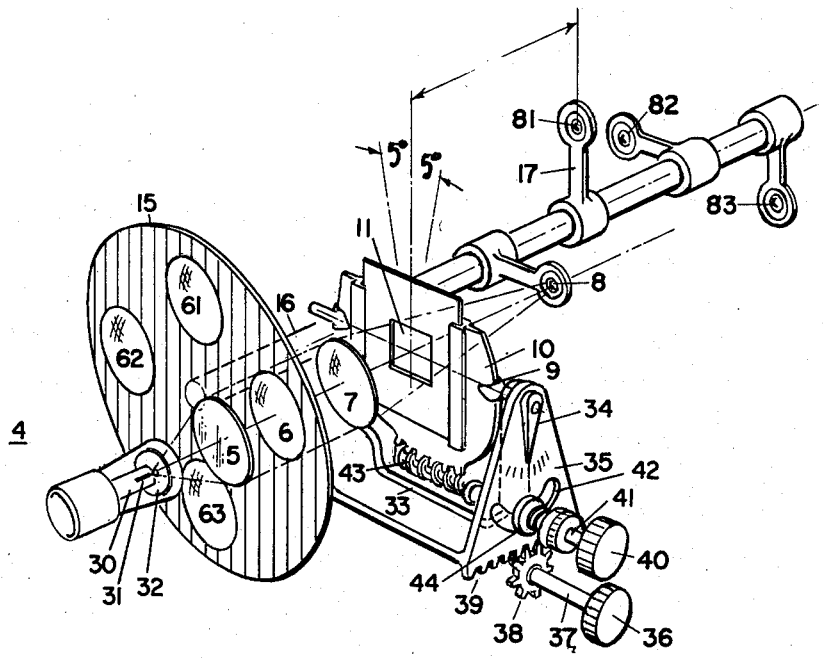
Figure 4 shows, in perspective, a device which permits projecting diapositives taken with any one of a number of cameras of different focal length without distortion.
Figure 5:
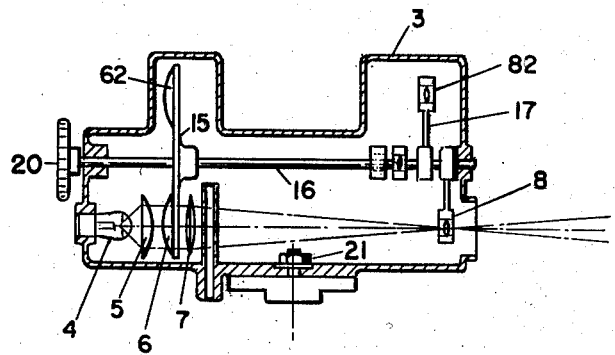
Figure 5 is a section taken along lines 5—5 of Figure 1.

Figure 2 shows the light source 4 also shown in Figures 4, 5. Any powerful point-light-source, such as zirconium lamp, may be used.

The zirconium lamp, especially well suited for this use, has a rod 30 carrying a zirconium pencil 31 in its axis. A plate 32 has a hole allowing small clearance around the pencil and with the proper voltage an arc is formed between the zirconium pencil and the edges of the hole in the plate. The rays emanating from the zirconium are intense and radiate from a focal light source toward the condenser lens, giving efficient use of the light produced.

A condenser lens system having three or more lenses, 5, 6, 7, focuses this light on a small point on the small-diameter projection lens 8. The intensely bright light emanating from the small opening in the plate 32 gives a small bright image on the projection lens 8. This image may be as small as $\frac{1}{16}$ inch. Only that portion of the projection lens, whatever its actual diameter, that is thus illuminated is the effective projection lens in the system. In this manner the number—focal length divided by lens diameter—may be in the order of 100 to 300 as against 4 in the usual projector. The higher this figure, the smaller the circle of confusion if the screen is not precisely at the point where the image of a point on the diapositive, projected through the effective projection lens comes to a focus, see Figure 8.

This permits the use of a simple, thin, projection lens. The usual lens has considerable thickness and the image of the light source may be on either surface or in the central plane of the lens. As the light passes through the surface of the lens there will be refraction. This will be the greater the thicker the lens and the larger the area of the lens that is used. By using a simple thin lens the smallest possible lens area is used and the amount of aberation is held at a minimum.

A frame 10 supporting a diapositive 11 is placed in the cone of light whose base is lens 7 and which has its apex in the projection lens 8.

The frame 10 is circular and free to slide in forks 9. These forks 9 are attached to a U-shaped cradle 33. A pointer 34 attached to the cradle indicates its tilt. The cradle supports a shaft 41 that extends through a slot 42 in the carriage 35. This shaft 42 also carries a worm gear 43 that meshes with teeth in the periphery of frame 10. Thus, by turning the adjusting means 40 the frame 10 is rotated in forks 9 and by moving shaft 41 in slot 42 the frame is tilted. When the desired tilt is reached, locking means 44 are tightened.

Referring to Figure 3 which shows the light beams diagrammatically, it will be seen that if the projector is so placed that the distance along the axis 12 is A, the distance from the plane of the projection lens 8 to the point 13 on the plat may be only ¾ A and at 14 more than 1¼ times A.

Obviously, the ordinary projection system shown in Figure 6, if in focus with the point where axis 12 meets the plat, would not be in focus for points 13 or 14. Also if the angle B which varies in focusing, does not chance to be the same as the angle which the cone of light passing through the lens of the camera made, the scale of the portions of the pictures at 13 and 14 would be distorted.

Referring again to Figure 4, the invention contemplates changing the lens 6, by substituting one of lenses 61, 62, 63 and modifying the distance of the diapositive from lens 8 to suit the camera with which that particular diapositive was taken.

Since it would be inconvenient to adjust this distance each time a diapositive, taken with another camera is projected, the apparatus shown in Figure 4 has been developed which associates the change of the distance from the diapositive to the lens 8 with the substitution of lenses 61, 62, or 63 for lens 6.

The disc 15 is mounted on the shaft 16. The disc carries the lenses 6, 61, 62, 63.

The shaft 16 also carries arms 17 which carry the projection lenses 8, 81, 82, 83. These arms 17 are so spaced along the shaft that the pair of lenses 6 and 8 will be suitable for use with diapositives taken in one type camera, 61 and 81 for those taken in another type of camera.

The parts shown in Figure 4 are mounted in a housing 3 shown in Figures 1 and 5. A knob 20 projects from one end of the housing and permits the shaft 16 to be turned. The entire housing can rotate about a stud 21 permitting the tilt of the projector to an angle that may be read on an arc 22. This stud 21 is carried by a sleeve 23 that can be slid up and down on rod 2 and clamped in any desired position by thumb-screw 24.

The frame 10 may be mounted as shown in Figure 4 in a manner permitting angular adjustment of the diapositive relative to the projection axis. The entire frame 10 and its angular adjusting means 40 are mounted on a carriage 35 which can be moved axially off the projector by turning the knob 36 attached to a shaft 37 carried by the frame of projector 3. The shaft carries a gear 38 meshing with a rack 39 on the carriage 35.

The invention provides an apparatus wherein the relation of the size of the diapositive to the distance of the diapositive from the projection lens is the same as the size of the negative was to the distance from the lens to the negative.

This is accomplished by arranging the apparatus so that this relationship can be duplicated from any one of the cameras whose reduced scale diapositives are to be projected.

With a projector wherein these relationships can be maintained, the projector can be mounted on stand 2 in Figure 1 and placed at the same angle that the camera made with the vertical. The image on plate 1 will, under these conditions, be a true representation, without distortion, of any flat terrain photographed from an aircraft.

However, since the screen is not normal to the projector axis—in fact may be 75 degrees or more off the normal plane—only the center of the image can be in true focus—all other parts of the projected image will have circles of confusion. The invention even permits using a screen that is parallel to the projection axis and to one side of it in projecting, for example, a diapositive made from a negative made with the camera axis parallel to the earth's surface.

To avoid these circles of confusion making the image so badly blurred as to be useless, a projection lens of extremely small effective diameter must be used. Whereas ordinary projection lenses are 2 or 3 inches in diameter, an effective projection lens diameter as small as $\frac{1}{8}$ to $\frac{1}{32}$ inch is contemplated.

It will be obvious, by reference to Figure 8 that if a point in a diapositive is to be projected through a projection lens of such small effective diameter, the light must be very intense.

The invention provides a light source that is very intense, circular, and of uniform intensity.

To secure an effective projection lens diameter so small cannot be achieved by using a lens whose actual diameter is only $\frac{1}{8}$ inch, or a hole in a shield before the lens. That would cause diffraction and create a confused image.

By focusing the light source on the projection lens, only that part of the lens so illumined is effective as a lens.

It is obvious that to secure the desired results the invention requires the coordination of the many elements, some of which are old in themselves, in the manner indicated.

I claim the following:

1. An apparatus for the projection and rectification of aerial photographs of the earth's surface taken at large angles with the vertical having, in combination, a point light source of high intensity, condenser lenses that form a sharp image of the point light source, a thin projection lens placed at the point of said image, means for holding the light source and the condenser lenses and the projection lens in the relative operative positions thus determined, a holder for a diapositive to be projected and placed between said condenser lenses and said projection lens, a projection screen in operative adjustable position and at an angle of 15 to 90 degrees relative to the projection axis, means for adjustably moving the holder of the diapositive relative to the projection axis, means for moving the holder of the diapositive relative to the projection lens to bring the diapositive and lens into the proper geometric and focusing relationship.

2. In a projection system of the type described in claim 1, a support for a diapositive between said condenser lens and projection lens, and means to move said diapositive relative to them, and means to tilt said diapositive.

3. A device for projecting and rectifying aerial photographs that are taken at an angle up to 75 degrees from the vertical and adapted to diminish and resolve focal errors introduced as a consequence of an uneven screen surface, the diapositive bulge, and in exact focal distance determinations; comprising a zirconium point arc type point light source, a system of condenser lenses adapted to condense and focus the rays upon a simple thin projection lens of a diameter slightly greater than the image formed thereon by said condenser lenses, the condenser lenses being so selected that the light cone entering the projection lens subtends the same angle as the light cone subtended between the photographic camera lens and the negative of said diapositive, means for placing a diapositive of an aerial photograph at a controlled position along the axis of the projector at a distance from said projection lens to form an image beyond the projection lens in similitude with the original camera image, a screen placed at an angle to the projection axis equal to the complement of the angle of photography.

4. A projector having, in combination, a housing, a point light source in said housing, a shaft in said housing to one side of the projection axis, a plurality of condenser lenses supported for rotation around said shaft in such manner that by turning the shaft each one of said lenses may be brought successively into the projection axis, a similar number of condenser lenses supported by said shaft in such manner that when the shaft is turned to bring a condenser lens into the projection axis a selected projection lens will also be brought into the projection axis at the position of the image of the light source formed by the condenser lens, a diapositive support on the projection axis located between the condenser lens and the projection lens, means to adjustably move the diapositive support along said projection axis relative to the projection lens to establish similitude of the relationship between the diapositive image and projection lens and the original taking camera.

5. A projection apparatus permitting the selection of a projection system having characteristics related to the characteristics of the camera taking a picture on which a diapositive is based, comprising, in combination, a housing, an essentially circular light source of high intensity and of extremely small diameter mounted in said housing, a definite position ahead of said light source for a unit comprising a condenser and a thin projection lens at such a fixed distance therefrom that when the unit is in said position the image of said light source will be focused in said projection lens, a plurality of said units each having a different condenser lens, and means for moving any one of said units into said position, means for supporting a diapositive in the housing between the condenser lens and the projection lens.

6. In a projection apparatus of the type described in claim 5, the use of light source and condenser lens system such that the ratio of the focal distance from the diapositive to the projection lens to the effective aperture shall exceed 100:1.

7. A device for projecting on a horizontal screen pictures taken at an oblique angle with the terrain, in combination, a horizontal screen, means for projecting along an axis having the same angle to said screen as the camera axis held to the terrain, a high intensity point light source in said axis, a condenser focusing the light source so that the cone of light has a similitude to the focal angle of a camera from which a diapositive has been made, a projection lens in said axis whose effective arc is the image of the light source, and which has long focal length, a diapositive supported between said condenser and projection lenses.

8. In a projection apparatus of the type described in claim 5, means for moving any of said units into position comprising a shaft mounted in said housing, each of said units supported on said shaft in a different axial plane so that by rotating the shaft a different unit will be used in the projection of the diapositive.

9. In a projection apparatus of the type described in claim 5, one condenser lens permanently fixed in the projection path, means for moving one of said units each containing a supplementary condenser lens and a thin projection lens into position, comprising a shaft mounted in said housing, each of said units supported on said shaft in a different axial plane so that by rotating the shaft a different unit will be used in the projection of the diapositive.

10. A method of projecting aerial photographs taken by cameras of different focal lengths wherein an aerial photograph is made with the camera at a large angle to the vertical, a reduced scale diapositive is made of the photograph, a light source provided that will give uniform intense illumination over a clearly defined circular area of small diameter, one of a number of projection systems is moved into position before said light source to form an image of the light source in a small diameter thin lens which acts as a projection lens of effective aperture determined by the diameter of said image, said image being formed by a bundle of rays evenly distributed over the diapositive by the condenser lens, the diapositive being so located with respect to the said projection lens that the angular relationship of all points of the scale image on the diapositive duplicates the angles of the corresponding points in the original camera to the taking lens of that camera, a screen or chart be placed beyond the projection lens at an angle with projection axis that is the complement of the angle the taking camera made with the vertical when the photograph was taken, the projection lens then forming an image on the screen or chart, the projection system selected having been one which had a projection lens of focal length to produce optimum focus at the intersection of the projection axis and the chart or at some other predetermined region of the chart, the angular accuracy of the projected points being unaffected by the accuracy of focus.

References Cited in the file of this patent

UNITED STATES PATENTS

| 1,174,479 | Darby | Mar. 7, 1916 |
| 1,565,413 | Broch et al. | Dec. 15, 1925 |
| 1,713,498 | Cooke | May 14, 1929 |
| 1,750,910 | Stark | Mar. 18, 1930 |
| 1,980,981 | Cooke | Nov. 20, 1934 |
| 2,072,286 | Wellington | Mar. 2, 1937 |
| 2,374,981 | Cooke | May 1, 1945 |
| 2,409,603 | Wood | Oct. 15, 1946 |
| 2,420,316 | Hine | May 13, 1947 |
| 2,448,568 | Zwillinger et al. | Sept. 7, 1948 |
| 2,608,094 | Best | Aug. 26, 1952 |
| 2,662,196 | Buckingham | Dec. 8, 1953 |
| 2,673,489 | Critoph | Mar. 30, 1954 |
| 2,674,041 | Gottgetreu | Apr. 6, 1956 |